(12) United States Patent
Simandl et al.

(10) Patent No.: US 7,767,637 B2
(45) Date of Patent: Aug. 3, 2010

(54) SOLVENT FOR URETHANE ADHESIVES AND COATINGS AND METHOD OF USE

(75) Inventors: Ronald F. Simandl, Knoxville, TN (US); John D. Brown, Harriman, TN (US); Jerrid S. Holt, Knoxville, TN (US)

(73) Assignee: Babcock & Wilcox Technical Services Y-12, LLC, Oak Ridge, TN (US)

( * ) Notice: Subject to any disclaimer, the term of this patent is extended or adjusted under 35 U.S.C. 154(b) by 709 days.

(21) Appl. No.: 11/749,234

(22) Filed: May 16, 2007

(65) Prior Publication Data

US 2008/0283097 A1 Nov. 20, 2008

(51) Int. Cl.
C11D 7/50 (2006.01)
(52) U.S. Cl. .................. 510/201; 510/202; 510/212; 510/407; 134/38
(58) Field of Classification Search ............. 510/201, 510/202, 212, 407; 134/38
See application file for complete search history.

(56) References Cited

U.S. PATENT DOCUMENTS

| | | | |
|---|---|---|---|
| 4,078,102 A | 3/1978 | Bendz et al. | |
| 4,287,335 A | 9/1981 | Ichimura | |
| 5,288,335 A | 2/1994 | Stevens | |
| 5,308,527 A | 5/1994 | Lallier et al. | |
| 5,545,353 A | 8/1996 | Honda et al. | |
| 5,561,215 A | 10/1996 | Pourreau | |
| 5,597,788 A | 1/1997 | Stevens | |
| 5,604,193 A | 2/1997 | Vlasblom | |
| 5,641,361 A | 6/1997 | Walsh et al. | |
| 5,648,324 A | 7/1997 | Honda et al. | |
| 5,753,603 A | 5/1998 | Lallier et al. | |
| 6,001,192 A | 12/1999 | Lallier et al. | |
| 6,040,285 A | 3/2000 | Lallier et al. | |
| 6,174,847 B1 * | 1/2001 | Lallier | 510/203 |
| 6,608,012 B2 | 8/2003 | Machac, Jr. et al. | |
| 6,827,329 B2 | 12/2004 | Mikiya et al. | |
| 6,923,873 B2 | 8/2005 | Pageau et al. | |
| 7,087,565 B2 | 8/2006 | Shank et al. | |
| 2004/0176263 A1 | 9/2004 | Filippini et al. | |
| 2004/0186033 A1 | 9/2004 | Waldrop et al. | |
| 2004/0248753 A1 | 12/2004 | Karlsson et al. | |
| 2005/0245412 A1 | 11/2005 | Shah et al. | |

(Continued)

FOREIGN PATENT DOCUMENTS

EP 0537579 4/1993

(Continued)

*Primary Examiner*—Gregory E Webb
(74) *Attorney, Agent, or Firm*—Michael J. Renner; Luedeka, Neely & Graham, P.C.

(57) ABSTRACT

A solvent for urethane adhesives and coatings, the solvent having a carbaldehyde and a cyclic amide as constituents. In some embodiments the solvent consists only of miscible constituents. In some embodiments the carbaldehyde is benzaldehyde and in some embodiments the cyclic amide is N-methylpyrrolidone (M-pyrole). An extender may be added to the solvent. In some embodiments the extender is miscible with the other ingredients, and in some embodiments the extender is non-aqueous. For example, the extender may include isopropanol, ethanol, tetrahydro furfuryl alcohol, benzyl alcohol, Gamma-butyrolactone or a caprolactone. In some embodiments a carbaldehyde and a cyclic amide are heated and used to separate a urethane bonded to a component.

23 Claims, 11 Drawing Sheets

U.S. PATENT DOCUMENTS

2006/0084732 A1   4/2006   Shakely et al.

FOREIGN PATENT DOCUMENTS

| EP | 0846735 | 6/1998 |
|----|---------|--------|
| JP | 08260067 | 10/1996 |
| JP | 10168362 | 6/1998 |
| JP | 10168363 | 6/1998 |
| JP | 10168364 | 6/1998 |
| JP | 2005133053 | 5/2005 |
| WO | WO0142376 | 6/2001 |
| WO | WO2005042136 | 5/2005 |

\* cited by examiner

SOLVENT FOR URETHANE ADHESIVES AND COATINGS AND METHOD OF USE

GOVERNMENT RIGHTS

The U.S. Government has rights to this invention pursuant to contract number DE-AC05-00OR22800 between the U.S. Department of Energy and BWXT Y-12, L.L.C.

FIELD

This invention relates to the field of solvents. More particularly, this invention relates to solvents for dissolving urethane adhesives and coatings.

BACKGROUND

Urethane materials are commonly used as adhesives, coatings, foam fillers, foam structures, and foam cushions. From an application perspective there is no meaningful-distinction between the terms "urethane" and "polyurethane." These materials are sometimes formulated as single part compositions and sometimes formulated as multi-part compositions that are mixed prior to application. Sometimes the urethanes are heated ("hot melted") for applications, sometimes special curing agents such as moisture are used. Urethanes are often applied as coatings to components and are often fabricated as molded mechanical components. Urethanes are capable of forming strong bonds with other materials such as wood, glass, and metal. As a consequence urethanes are often used as adhesives.

Frequently it is desirable to detach a urethane from a component, or to separate two components that have been bonded together by a urethane adhesive. For many years methylene chloride was the "gold standard" solvent for debonding. However, this solvent has been identified as a hazardous air pollutant, and it is a suspect carcinogen. Hence, its use has been eliminated by most of industry. While a number of replacement solvents have been identified, very few approach the effectiveness of methylene chloride. Also, many of the replacement solvents are flammable and constitute hazardous wastes under the Resource Conservation and Recovery Act (RCRA) at 42 U.S.C. 6921-6939e. Other replacement materials have various shortcomings such as a pungent odor, the potential for diversion to illicit drug manufacturing, or ineffectiveness in attacking urethanes in thin bond lines. What are needed therefore are more effective and practical solvents for use in debonding urethane materials from components.

SUMMARY

The present invention provides in a first embodiment, a miscible solvent that includes from about 20 to about 80 wt % carbaldehyde and from about 20 to about 80 wt % cyclic amide. In a first variation of the first embodiment the carbaldehyde includes benzaldehyde or a structural analog thereof, and in a first alternative of the first variation of the first embodiment, the cyclic amide includes N-methylpyrrolidone or a structural analog thereof. In a first optional composition of the first alternative of the first variation of the first embodiment, the solvent includes from about 20 to about 30 wt % benzaldehyde or a structural analog thereof and from about 70 to about 80 wt % N-methylpyrrolidone or a structural analog thereof. In a second optional composition of the first alternative of the first variation of the first embodiment, the solvent includes from about 40 to about 60 wt % benzaldehyde or a structural analog thereof and from about 40 to about 60 wt % N-methylpyrrolidone or a structural analog thereof. In a second variation of the first embodiment the cyclic amide includes N-methylpyrrolidone or a structural analog thereof. In a third variation of the first embodiment the solvent further incorporates an extender.

A second embodiment provides a solvent that includes essentially from about 20 to about 80 wt % carbaldehyde, from about 20 to about 80 wt % cyclic amide, and up to about 60 wt % non-aqueous extender. In a first variation of the second embodiment, the carbaldehyde includes benzaldehyde or a structural analog thereof. In a first alternative of the first variation of the second embodiment, the cyclic amide includes N-methylpyrrolidone or a structural analog thereof. In a first optional composition of the first alternative of the first variation of the second embodiment the solvent includes from about 20 to about 30 wt % benzaldehyde or a structural analog thereof and from about 70 to about 80 wt % N-methylpyrrolidone or a structural analog thereof. In a second optional composition of the first alternative of the first variation of the second embodiment, the solvent includes from about 30 to about 40 wt % benzaldehyde or a structural analog thereof and from about 60 to about 70 wt % N-methylpyrrolidone or a structural analog thereof. In a third optional composition of the first alternative of the first variation of the second embodiment, the solvent includes from about 40 to about 60 wt % benzaldehyde or a structural analog thereof and from about 40 to about 60 wt % N-methylpyrrolidone or a structural analog thereof. In a second variation of the second embodiment, the cyclic amide includes N-methylpyrrolidone or a structural analog thereof. In a third variation of the second embodiment the non-aqueous extender includes one or more chemicals selected from the group consisting of isopropanol, ethanol, tetrahydro furfuryl alcohol, benzyl alcohol, and a caprolactone.

A method for separating a urethane bonded to a component at a bond interface is provided, where the urethane has an exposed surface. The method includes a step (a) of contacting the exposed surface with a solvent that includes a carbaldehyde and a cyclic amide for a period of time until the bond interface is weakened, where the solvent is heated to a temperature above ambient temperature for at least a portion of the period of time. The method also includes a step (b) of separating the component from the urethane at the bond interface. In a first variation of the method, step (a) includes contacting the exposed surface with a solvent that includes a carbaldehyde and N-methylpyrrolidone or a structural analog thereof. In a first alternative of the first variation of the method, step (a) includes contacting the exposed surface with a solvent that includes benzaldehyde or a structural analog thereof and N-methylpyrrolidone or a structural analog thereof. In a first option of the first alternative of the first variation of the method, step (a) includes contacting the exposed surface with a solvent that includes from about 20 to about 30 wt % benzaldehyde or a structural analog thereof and from about 70 to about 80 wt % N-methylpyrrolidone or a structural analog thereof. In a second option of the first alternative of the first variation of the method, step (a) includes contacting the exposed surface with a solvent that includes from about 40 to about 60 wt % benzaldehyde or a structural analog thereof and from about 40 to about 60 wt % N-methylpyrrolidone or a structural analog thereof. In a second variation of the method, step (a) includes contacting the exposed surface with a solvent that includes benzaldehyde or a structural analog thereof and a cyclic amide.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
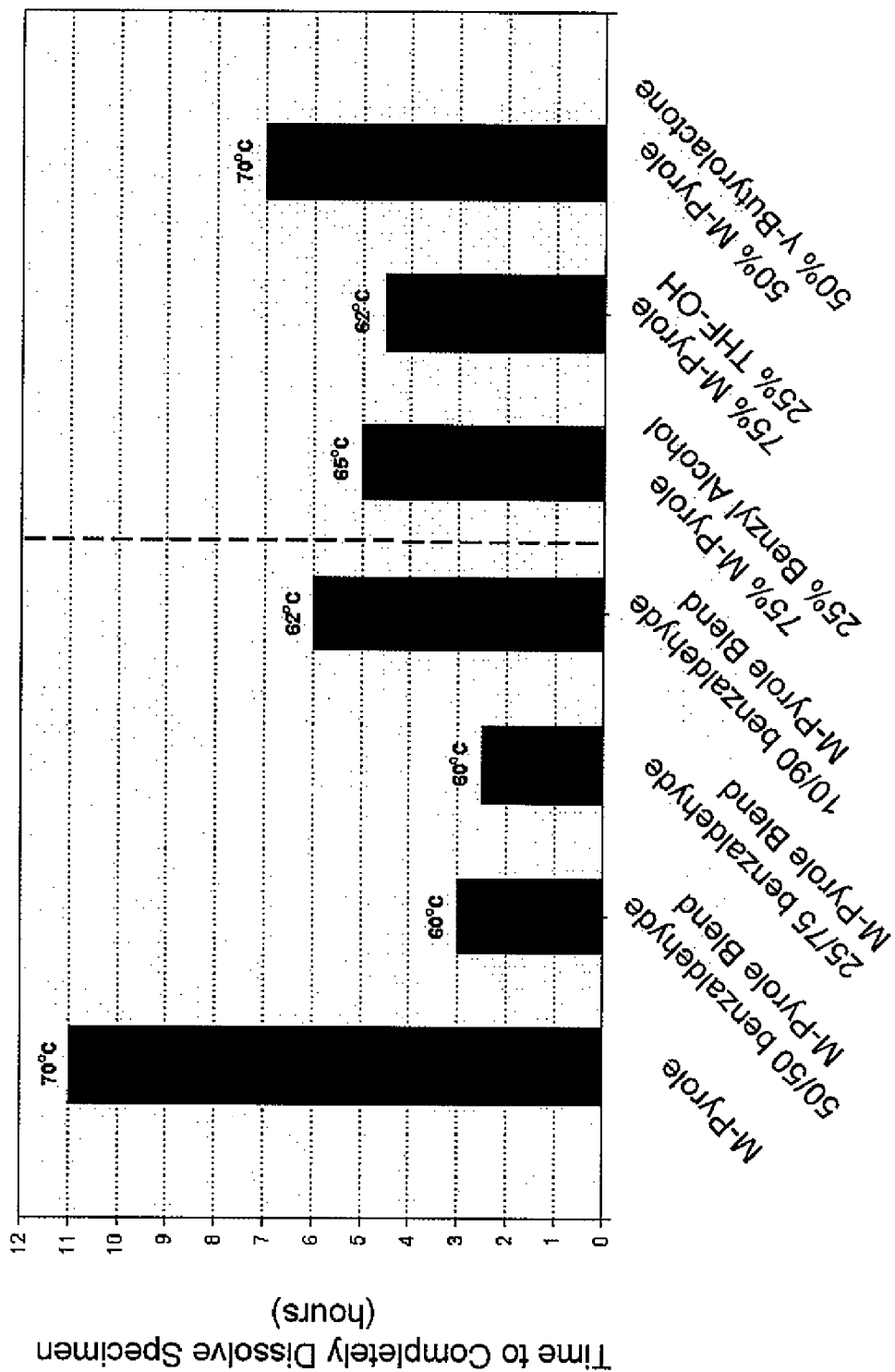
FIG. 1 is a bar chart that graphs the time required to completely dissolve certain 0.29 g urethane test specimens using different solvents.

In the following detailed description of the preferred embodiments, reference is made to the accompanying drawings, which form a part hereof, and within which are shown by way of illustration the practice of specific embodiments of solvents, including miscible solvents and methods for separating urethane bonded to a component. It is to be understood that other embodiments may be utilized, and that chemical changes may be made and processes may vary in other embodiments.

One chemical that has been found to be effective in solvents for dissolving urethanes is N-methylpyrrolidone or "M-pyrole." M-pyrole is a low toxicity, non-RCRA-hazardous, high flash point solvent. One formulation for dissolving urethanes is a blend of M-pyrole and gamma-butyrolactone. This latter solvent is likewise a reasonably low toxicity, high flash point solvent. However, recently, diversion of this solvent to the illicit drug trade is making this solvent more difficult to obtain and use. Three other non-RCRA-hazardous solvents have been identified as being particularly effective in dissolving urethanes. One of these solvents, benzyl alcohol, is sometimes used as a paint removing solvent. Screening studies showed that combinations of benzyl alcohol and M-pyrole are quite effective in dissolving urethanes. A second solvent, tetrahydrofurfuryl alcohol is sometimes used as a solvent for vinyl resins, cellulose esters, nylon, and chlorinated rubber. Combinations of tetrahydrofurfuryl alcohol and M-pyrole proved also to be quite effective in dissolving urethanes. However, the acidic proton on the alcohol functionality of both benzyl alcohol and tetrahydrofurfuryl alcohol is a problem in some applications because of its incompatibility with some component materials. A third solvent, benzaldehyde, has not been used for paint removing formulations, but was found to be very effective in combination with M-pyrole for dissolving urethanes.

Benzaldehyde is an example of a carbaldehyde. In some embodiments the carbaldehyde used in a solvent may include benzaldehyde, and in some embodiments the carbaldehyde that is used may consist only of benzaldehyde. Other carbaldehydes are also considered to be useful as solvents in some embodiments. For example, utility for $C_6H_{11}CHO$ (cyclohexanecarboxaldehyde, which is also referred to as hexahydrobenzaldehyde) is expected since its structure is derived from benzaldehyde. However, this molecule is slightly larger (i.e., the chemical has a larger molar volume), so it would be expected to act more slowly than benzaldehyde. In addition, by hydrogenating the benzaldehyde, the aromatic character is changed to aliphatic, which may reduce the effectiveness of solvents made with $C_6H_{11}CHO$.

N-methylpyrrolidone (M-pyrole) belongs to the class of chemicals called cyclic amides. In some embodiments the cyclic amide used in a solvent may include M-pyrole, and in some embodiments the cyclic amide that is used may consist only of M-pyrole. Other cyclic amides are also considered to be useful as solvents in some embodiments. Utility for N-ethylpyrrolidone and N-propylpyrrolidone is also expected although they constitute larger molecules than N-methylpyrrolidone and therefore would be expected to work more slowly.

A feature of some embodiments described herein is that the chemical constituents of a solvent are miscible with one another. As in ordinary usage of that terminology in the art, when two or more chemicals are referred to as miscible it means that when the two or more chemicals are mixed together at prescribed percentages they do not separate into two or more phases. As used herein, the term "miscible solvent" refers to a solvent in which all of the constituents are miscible without the inclusion of a surfactant or emulsifier to prevent separation of the mixture into two or more phases. For example, benzaldehyde is miscible with N-methylpyrrolidone.

In some embodiments the solvent consists only of a carbaldehyde and a cyclic amide, and in some embodiments a carbaldehyde and a cyclic amide are combined with other constituents. In some embodiments approximately 20-80 wt % carbaldehyde and approximately 20-80 wt % cyclic amide are used. In some embodiments approximately 25 wt % carbaldehyde and approximately 75 wt % cyclic amide are used, with 20-30 wt % carbaldehyde and approximately 70-80 wt % cyclic amide being acceptable. In some embodiments approximately 50 wt % carbaldehyde and approximately 50 wt % cyclic amide are used with 40-60 wt % carbaldehyde and approximately 40-60 wt % cyclic amide being acceptable.

In some embodiments up to approximately 60 wt % "extender" may be added to the carbaldehyde/cyclic amide mixture. Herein the term "up to 60 wt % extender" includes a composition that includes 0 wt % extender (i.e., no extender). An extender is an ingredient that does not dissolve urethane to any significant degree. An extender may be added in order to deliberately slow down the dissolution of the urethane in order to improve the manageability of a disassembly project. An extender may also be added in order to decrease the cost of a solvent where a large volume of solvent is needed and the time needed to dissolve the urethane is not critical. Isopropanol or ethanol may be used as extenders. Other solvents that may be used as an extender are tetrahydro furfuryl alcohol and benzyl alcohol. The caprolactones may also be used as an extender. Water may also be used as an extender, but benzaldehyde is only slightly soluble in water so an emulsifier may be needed if water is used as an extender. Consequently it is often desirable to use a "non-aqueous extender." A non-aqueous extender is an extender that does not include water as a constituent, although trace quantities of water may be present as an impurity conveyed with other constituents of the extender. Dehydrated constituents (i.e., constituents that have any trace quantities of water removed) may be used in some embodiments.

Active additives may also be added to the composition of some embodiments. For example, gamma-butyrolactone and piperazine may be used as active additives, but the availability of gamma-butyrolactone is being restricted because of its potential diversion for illegal drug trade.

To separate a urethane that is bonded to a component at a bond interface, an exposed surface of the urethane is contacted with a solvent for a period of time until the bond interface is weakened or completely dissolved. This may be accomplished by immersing the component(s) and bonded urethane in a bath of the solvent, or by spraying, brushing, or otherwise applying a layer of solvent to an exposed surface of the urethane. Desirably the solvent is heated to a temperature above ambient temperature for at least a portion of the period of time of exposure to the urethane. For example the solvent may be heated to about 60-65° C., and in other embodiments higher temperatures such as 80-90° C. may be used.

Following this step of exposing the bonded urethane to the solvent, the component is separated from the urethane at the bond interface. It is to be understood that this latter step may be accomplished by such techniques as completely dissolving the urethane, or by physically separating the urethane from the component at the bond interface.

The utility of various urethane solvents in dissolving urethane may be evaluated by exposing urethane coated or bonded components to the solvents. The comparative effectiveness of the various urethane solvents may be evaluated by observing the time required for the solvent to completely dissolve the urethane. An alternate technique for evaluating the effectiveness is to measure the time required for the solvent to weaken the bond interface sufficiently for the component and the urethane to be separated physically from one another. In cases where the urethane is used to bond two components together, a variation of the alternative technique measures the tensile strength of the bond after exposure of the bond to the solvent for a prescribed period of time.

Two specific bonding systems that are representative of urethane bonding systems are ADIPRENE LW520-XU205 urethane adhesive and Halthane 88-Asilamine urethane adhesive. ADIPRENE is a trademark for a brand of urethane products. Halthane is a customized urethane and Asilamine is a customized polymer curing agent. To evaluate the effectiveness of various solvents, initial screening tests were conducted on small, historical specimens of fully cured ADIPRENE LW520-XU205 urethane that measured 2 mm×7 mm×26 mm and weighed 0.29 g. These specimens were prepared and cured at 80° C. many years ago. FIG. 1 compares the relative effectiveness of various solvents and solvent blends in dissolving these small specimens of aged (fully cured) ADIPRENE LW520-XU205 urethane.

The "gold standard" solvent methylene chloride is not shown in FIG. 1 because test specimens were found to only soften and swell in methylene chloride, and not dissolve. For example, an aged specimen of ADIPRENE LW520-XU205 urethane swelled 3 times in volume when immersed for 4 days in methylene chloride, but remained firm and retained its shape in this solvent. An aged specimen of Halthane 88-Asilamine urethane swelled 16 times in volume when immersed in methylene chloride for 4 days, and became a soft, shapeless gel.

In the way of benchmarks, M-pyrole by itself completely dissolved a urethane specimen in 11 hours at 70° C. Benzaldehyde alone on a strip of urethane simply swelled the strip into a gel after 24 hours, but did not dissolve it. In examples according to exemplary embodiments, various blend ratios of benzaldehyde and M-pyrole were tested. A solvent mixture containing 50 wt % benzaldehyde+50 wt % M-pyrole dissolved a specimen in only 3 hours at 60° C. A 25 wt % benzaldehyde+75 wt % M-pyrole blend dissolved the specimen in even less time, 2.5 hours at 60° C. A 10 wt % benzaldehyde+90 wt % M-pyrole blend was less effective than either the 50/50 blend or the 25/75 blend.

By way of further comparison, a blend consisting of 25 wt % benzyl alcohol and 75 wt % M-pyrole did dissolve the sample of urethane, but it took twice as long as the 25 wt % benzaldehyde-75 wt % M-pyrole blend. A 25 wt % tetrahydrofurfuryl alcohol-75 wt % M-pyrole blend likewise dissolved a specimen of ADIPRENE LW520-XU205 urethane, but also at a slower rate than the 25 wt % benzaldehyde-75 wt % M-pyrole blend. Likewise, a commercial blend consisting of 50 wt % M-pyrole and 50 wt % gamma-butyrolactone took nearly three times longer to dissolve a specimen of urethane than did the 25/75 benzaldehyde/M-pyrole blend.

Figure 2:
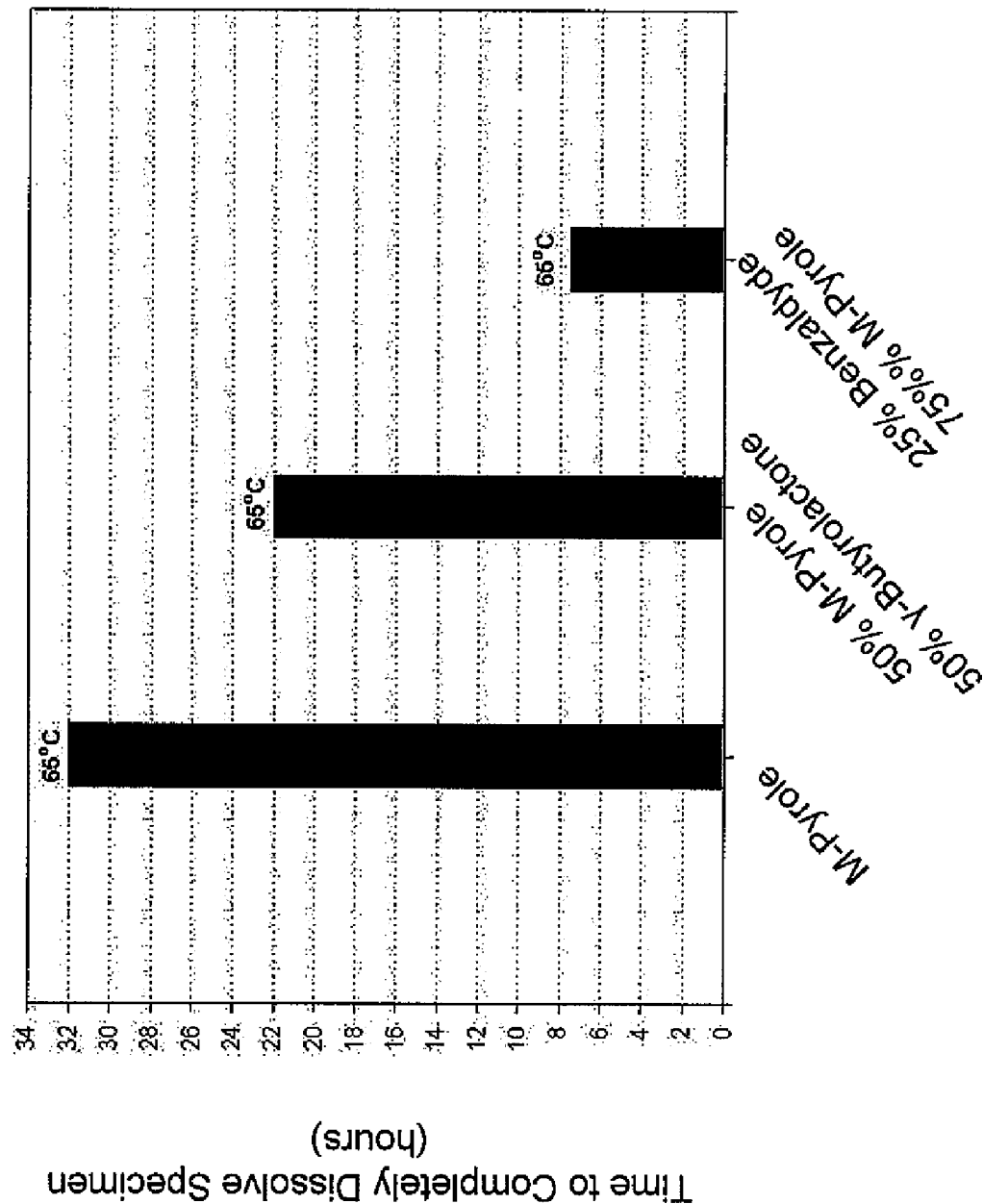
FIG. 2 is a bar chart that graphs the time required to completely dissolve certain 0.25 g urethane test specimens using different solvents.

FIG. 2 compares the rates of dissolving aged specimens of Halthane 88-Asilamine urethane in various solvent blends. The specimens measured ~6 mm×6 mm×10 mm and weighed 0.25 g. The data first indicates that Halthane 88-Asilamine urethane is considerably more difficult to dissolve than ADIPRENE LW520-XU205 urethane. M-pyrole took 32 hours to dissolve this specimen at 65° C. A commercial blend consisting of 50 wt % M-pyrole and 50 wt % gamma-butyrolactone took less time, i.e., 22 hours. The 25 wt % benzaldehyde-75 wt % M-pyrole took ⅔ less time than the commercial blend of M-pyrole and gamma-butyrolactone or only 7.5 hours at 65° C.

Figure 3:
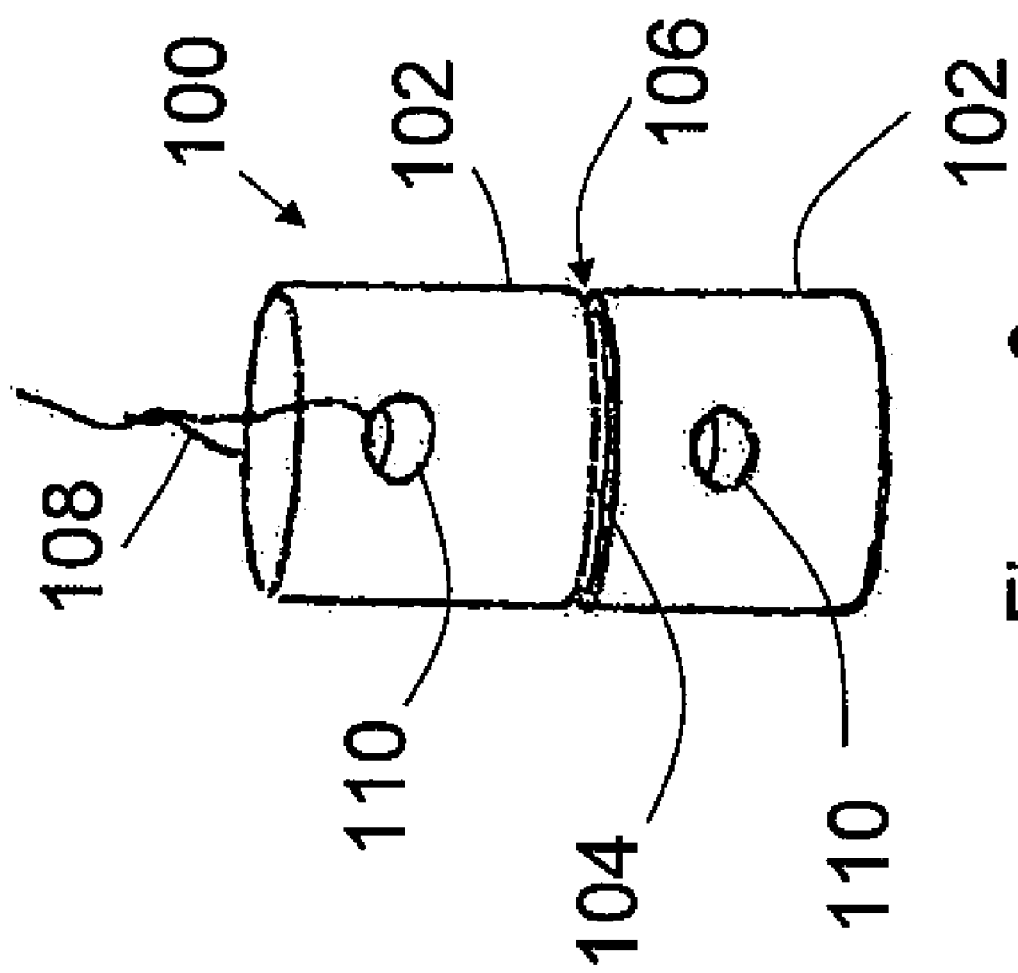
FIG. 3 is a perspective illustration of a butt-tensile test specimen.

A very useful, definitive test of solvent power is the effectiveness of the solvent in dissolving adhesive from a very tight bond line. In such tests the solvent does not have access to all surfaces of the adhesive, but rather to only the limited surface available around the edges of the bond. Debonding then becomes rate dependent upon how quickly a solvent is able to diffuse in from the edges of the bond. A first series of tests was run on 1.1" diameter steel butt-tensile specimens 100, as illustrated in FIG. 3. In these tests, pairs of steel butt-tensile studs 102 were bonded using ADIPRENE LW520-XU205 urethane adhesive 104 having a 0.005" wide bond line 106. The adhesive 104 was fully cured at 80° C. for 2 days. A wire 108 through a hole 110 in the studs 102 was used to suspend bonded butt-tensile specimens 100 in various solvents at 80° C. for 9 hours/day.

Figure 4:
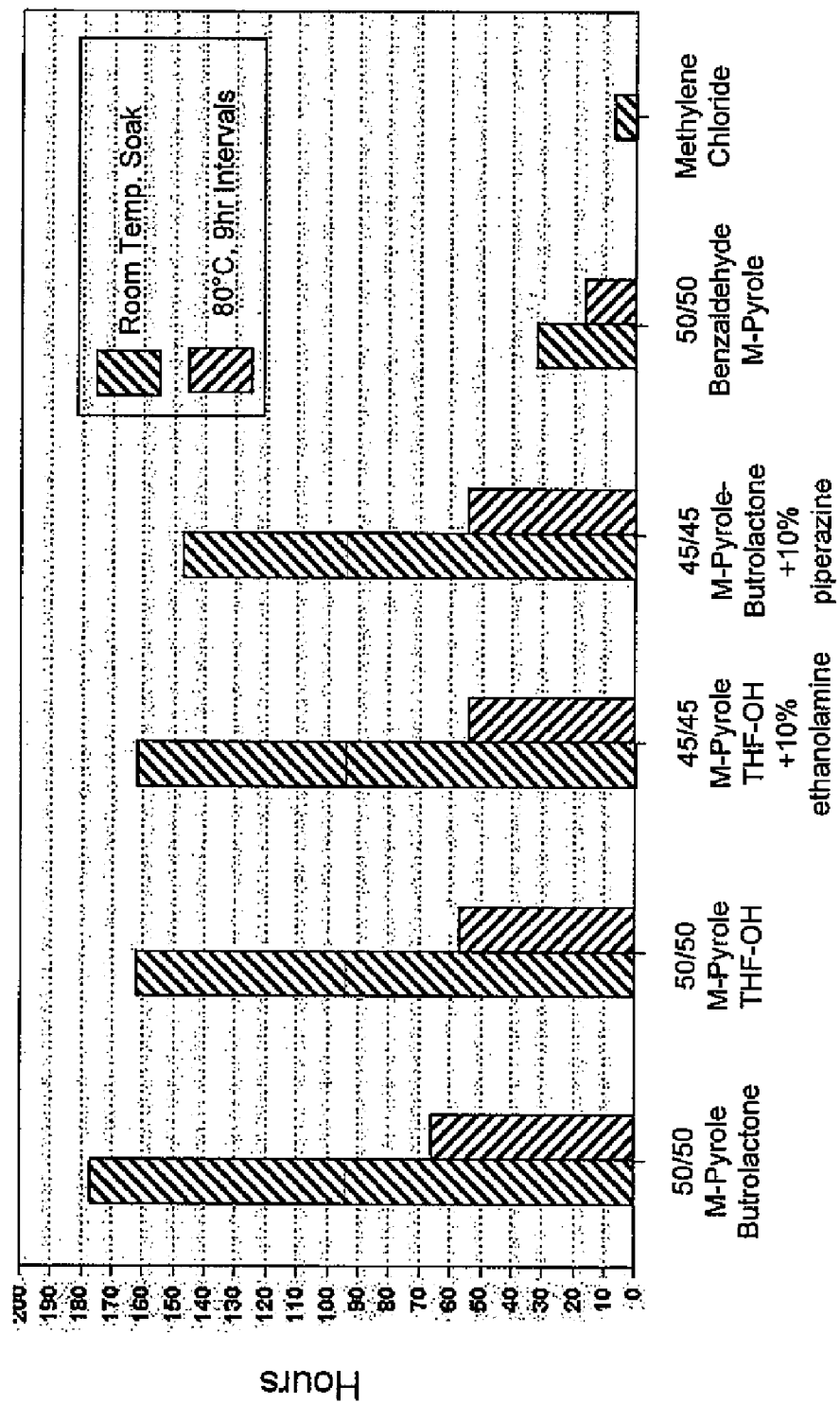
FIG. 4 is a bar chart that graphs the time required to de-bond butt-tensile test specimens of FIG. 3 using different solvents under two different soak conditions.

The butt-tensile specimens 100 of FIG. 3 were heated in solvents at 80° C. for only 9 hours. For safety reasons, heating was suspended during the evening and during weekends. Heating was also done using an argon cover gas in order to avoid flammability issues. Although argon was used in this example, any other inert gas could be used. The debonding results are illustrated in FIG. 4. The soak times for the evenings and weekends are shown as "Room Temperature Soak" bars and soak times at elevated temperature are shown as "80° C., 9 hour Intervals" bars. One pair of specimens was suspended in methylene chloride at room temperature. This pair debonded after 7 hours, and this represented the fastest debonding time. However, as previously indicated the use of methylene chloride is no longer permitted in many industries. However, it does serve as a reference solvent.

The first plot in FIG. 4 shows the behavior of bonded butt-tensile specimens in a commercial blend of 50 wt. % M-pyrole and 50 wt. % gamma-butyrolactone at 80° C. The specimens suspended in the M-pyrole/gamma-butyrolactone debonded after 66 hours of heating (9 hours/day), alternating with 175 hours of soaking at room temperature.

A second set of specimens was heated in a 50/50 blend of M-Pyrole and tetrahydrofurfuryl alcohol (THF-OH). The bond of the second set of specimens released after 57 hours of heating at 80° C., alternating with a total of 163 hours of soaking at room temperature.

The third set of specimens was soaked in a 45/45 blend of M-pyrole, THF-OH, and 10 wt % ethanolamine at 80° C. The purpose of this test was to determine if there would be any benefit to adding a minor amount of a slightly basic molecule such as ethanolamine. One can see from FIG. 4, that there was little if any benefit to adding ethanolamine to the M-pyrole/THF-OH blend.

The fourth set of specimens used the small cyclic molecule piperazine in the 45/45 blend of M-pyrole and gamma-butyrolactone. In this case, 10 hours were saved over the 66 hours required as shown in the first set of plots of FIG. 4 for M-pyrole and gamma-butyrolactone without the piperazine.

The fifth set of specimens was immersed in a 50 wt % benzaldehyde+50 wt % M-pyrole solvent blend according to an embodiment of the disclosure. The specimens debonded in only 16 hours at 80° C., alternating with 32 hours of soaking at room temperature. Debonding of the specimens in the 50/50 benzaldehyde/M-pyrole blend was 4 times faster than the commercial 50/50 blend of M-pyrole and gamma-butyrolactone, at the same temperature. Moreover, debonding time was only 2.3 times longer than debonding using methylene chloride.

Figure 5:
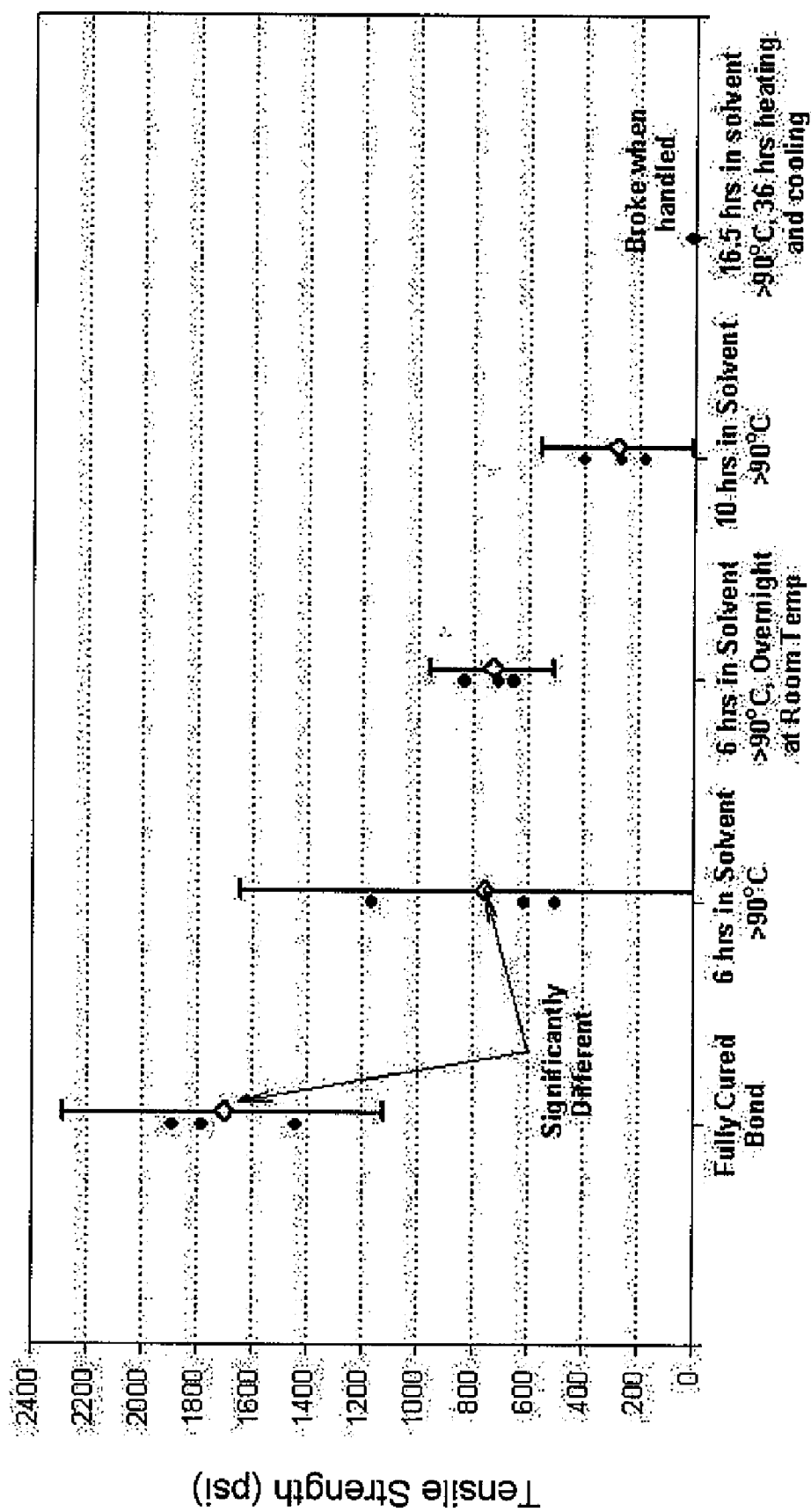
FIG. 5 illustrates the tensile strength of fully-cured butt-tensile specimens after immersion in a solvent under different conditions, compared with their tensile strength before such immersion.

The butt-tensile examples were repeated using 15 pairs of steel specimens that were bonded using ADIPRENE LW520-XU205 urethane adhesive. The tensile strength of these bonds was periodically determined using an Instron instrument. Three of these specimens were tested before immersion in solvent. The 12 remaining specimens were immersed in a large reactor containing 25 wt % benzaldehyde and 75 wt % M-pyrole. Three specimens were removed after heating for 6 hours in the solvent at temperatures at or above 90° C. These specimens were dried, cooled, and tested to failure. The reactor was then turned off overnight, and the specimens were allowed to continue to soak in the solvent blend. In the morning, three more specimens were removed and tested to failure. The six remaining specimens were heated another 4 hours at or above 90° C. Three of these specimens were removed, cooled, dried, and tested to failure on the Instron. The final three specimens were allowed to soak overnight in the solvent at room temperature. The next day, the final three specimens were reheated in the solvent for another 6.5 hours at or above 90° C. The total time for the final three specimens at or above 90° C. for these specimens was 16.5 hours. When removed from the solvent and cooled, all three specimens broke in the investigator's hands. Data for the above specimens are plotted in FIG. 5.

Figure 6B:
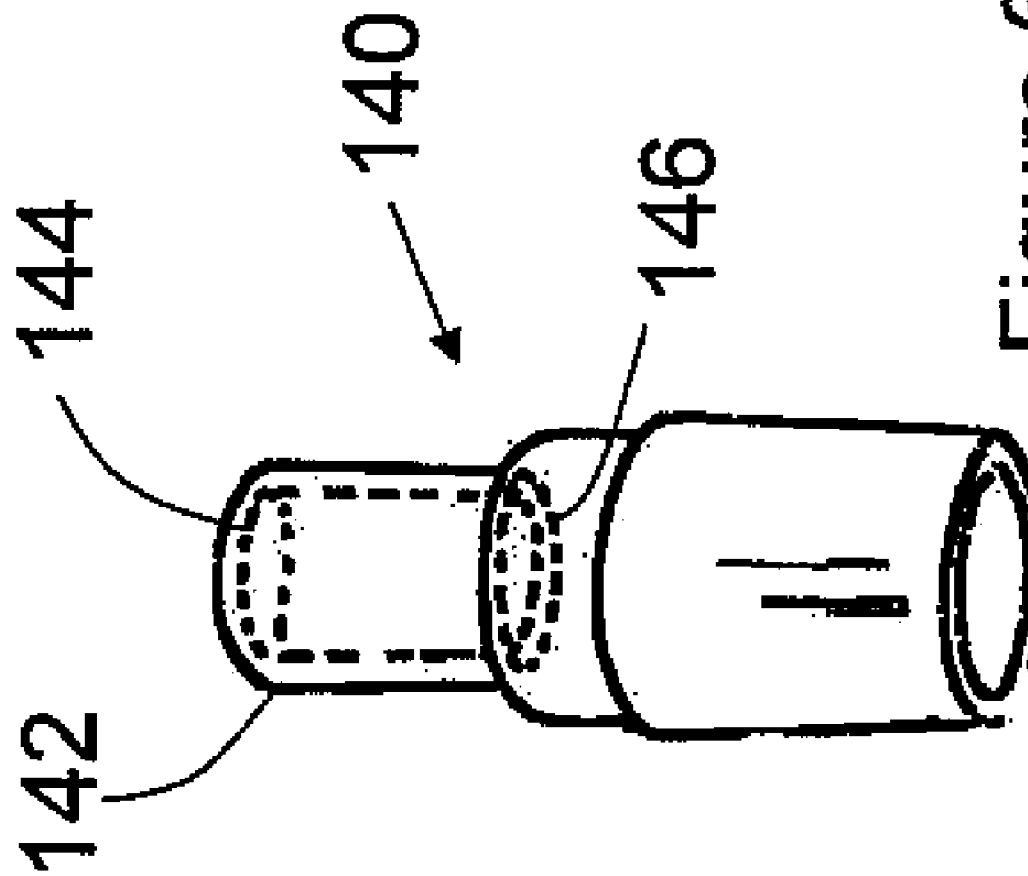
FIGS. 6A and 6B illustrate components of a test apparatus that was used in some experiments.
Figure 6A:
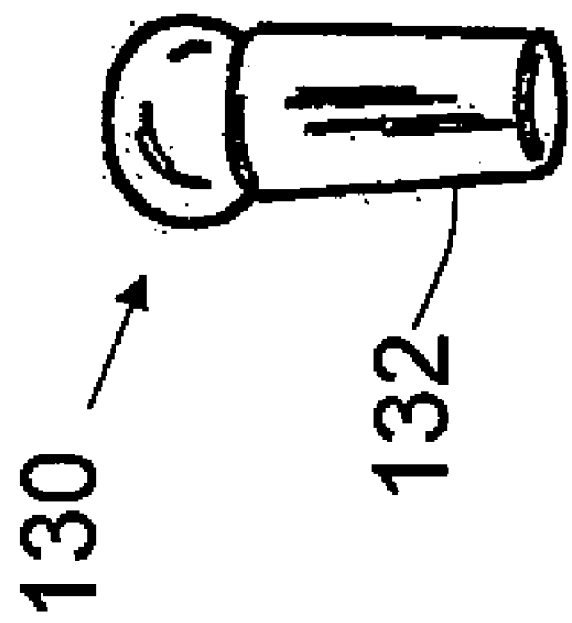

FIGS. 6A and 6B illustrate a further test specimen apparatus that was used for some examples, A tapered plug 132 of a standard size 24/40 ground glass bottle stopper 130 was bonded into a standard size 24/40 ground glass inlet 142 of a glass reduction fitting 140. The resultant bond line was very thin and accessible only from a first bond surface at inlet end 144 and a second bond surface at inlet end 146.

In a further series of examples test specimens were prepared by bonding the stopper 130 of FIG. 6A into the reduction fitting 140 of Figure using ADIPRENE LW520-XU205 urethane adhesive. The bond was fully cured at 80° C. This bonded assembly was then immersed in a commercial blend of 50 wt % M-pyrole and 50 wt % gamma-butyrolactone. After 15 days of immersion at room temperature, the solvent showed very little evidence of diffusing into the bond line between the stopper 130 and the fitting 140. Hence, after 15 days of immersion, the solvent was heated 9 hours per day to 80° C. For safety reasons, the solvent was allowed to cool overnight. Heating was also done under an argon cover gas, once again to avoid flammability issues. Heating was conducted for 14 days for 9 hours/day for a total time of 126 hours at 80° C. (and nearly 700 hours at room temperature), before the joint finally released. The results for the butyrolactone/M-pyrole blend are shown in FIG. 7.

A similar 24/40 ground glass joint was bonded using ADIPRENE LW520-XU205 urethane adhesive and the urethane fully cured. It was then immersed in a 25 wt % benzaldehyde-75 wt % M-pyrole blend for 10-hour periods at 100° C. alternating with room temperature soaking, under an argon cover gas. The bond joint released after just 20 hours of heating at 100° C., as shown in FIG. 7.

For purposes of comparison, the same ground glass joint was bonded with ADIPRENE LW520-XU205 urethane adhesive, fully cured, and then immersed in methylene chloride. FIG. 7 shows that the bond joint released after 80 hours of immersion. The result with methylene chloride was not too surprising considering the fact that methylene chloride simply swells the urethane into a firm gel, while the 25 wt %/75 wt % benzaldehyde/M-pyrole blend actually dissolves the urethane.

Figure 7:
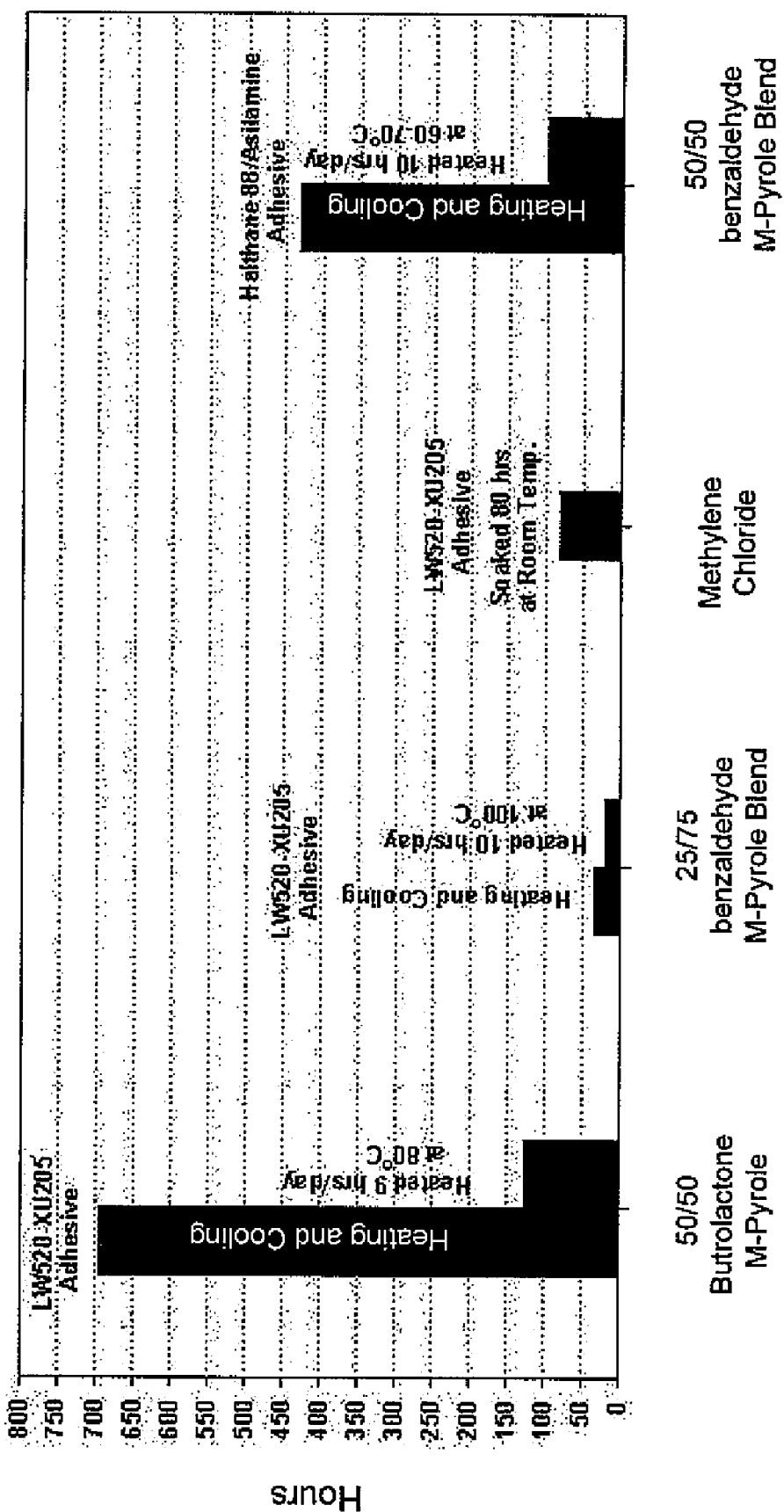
FIG. 7 is a bar chart that graphs the time required to de-bond test specimens fabricated using components of FIGS. 6A and 6B, using different solvents under different soak conditions.

The final debonding experiment shown in FIG. 7 involved the same ground glass joint bonded with Halthane 88-Asilamine urethane adhesive. The adhesive joint was fully cured at 80° C. The bonded joint was immersed in a 50 wt % benzaldehyde-50 wt % M-pyrole blend at a lower temperature, i.e. 60-70° C., for 9-10 hours/day, under an argon cover gas, as the above specimens. The adhesive bond released after a total of 100 hours at 60-70° C., alternating with soakings at room temperature overnight. The longer (100-hour) debonding time was due to a combination of three factors: (a) Halthane 88-Asilamine urethane is more difficult to dissolve than ADIPRENE LW520-XU205 urethane adhesive, (b) a lower solvent temperature (70° C.) was used to debond the Halthane 88-Asilamine bond (compared with 100° C. for the ADIPRENE LW520-XU205 urethane adhesive), and (c) a 50/50 wt % ratio of benzaldehyde and M-pyrole was used to dissolve the Halthane 88-Asilamine bond compared with a 25/75 wt % ratio for the ADIPRENE LW520-XU205 bond. However, debonding of the Halthane 88-Asilamine urethane adhesive was faster with the 50/50 wt % benzaldehyde/M-pyrole blend than debonding the ADIPRENE LW520-XU205 urethane adhesive using the commercial 50/50 wt % M-pyrole-butyrolactone blend at a higher temperature (80° C.).

Figure 8:
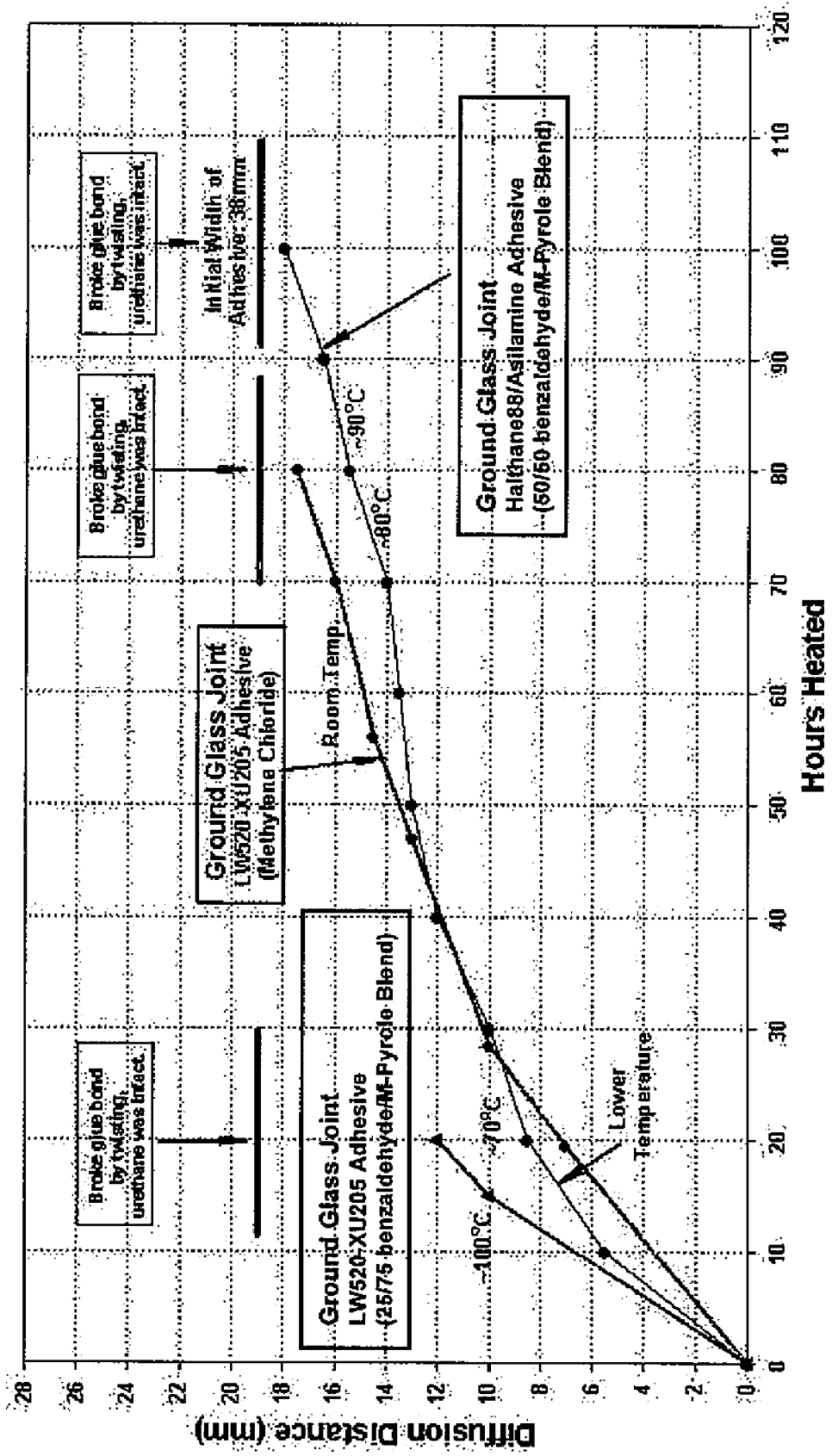
FIG. 8 presents plots of diffusion rates of solvents into bonds formed by joining the components of FIGS. 6A and 6B with certain urethane adhesives.

Progress of diffusion of the solvent into the bonded ground glass joint was readily discerned by visual inspection. Solvent diffusion rates were plotted in FIG. 8. The diffusion rate of all solvents through both ADIPRENE LW520-XU205 urethane adhesive and through Halthane 88-Asilamine urethane adhesive in the ground glass joint slowed as the path length through the swollen gel increased over time. The diffusion rate of the 50/50 benzaldehyde/M-pyrole blend above 90° C. through Halthane 88-Asilamine urethane gel matched that of methylene chloride at room temperature through swollen ADIPRENE LW520-XU205 urethane gel. Interestingly, the rate of diffusion of the 25/75 benzaldehyde/M-pyrole blend at 100° C. through ADIPRENE LW520-XU205 urethane gel exceeded that of methylene chloride at room temperature through the same swollen gel.

Figure 9:
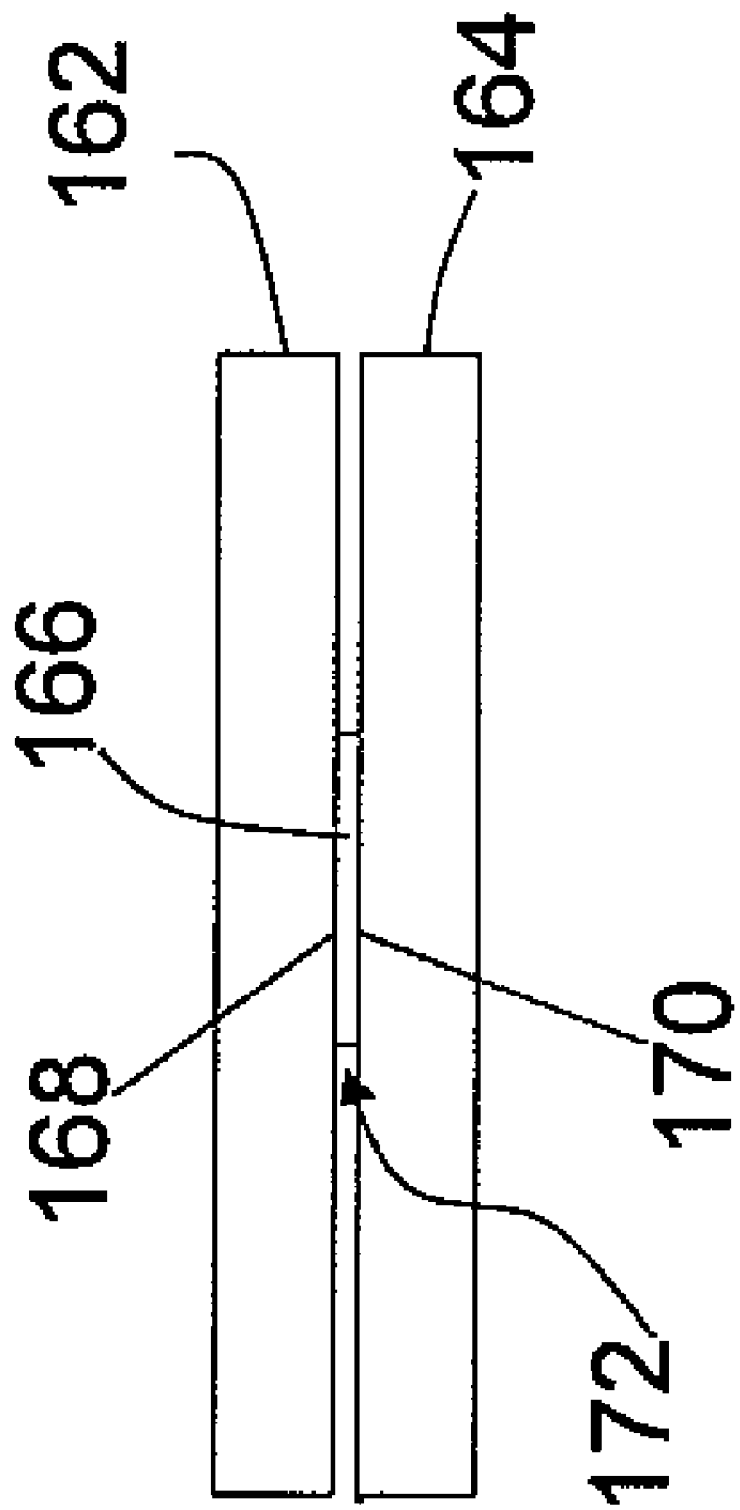
FIG. 9 illustrates a further test specimen apparatus that was used in some experiments.

FIG. 9 illustrates a further test specimen apparatus that was used in some examples. A first glass plate 162 was bonded to a second glass plate 164 using urethane adhesive 166, forming a first bond interface 168 and a second bond interface 170. The glass plates 162 and 164 measured 14 cm in diameter and were 1 cm thick. Two bond line 172 thicknesses were tested: i.e., 0.002" and 0.005". The thin bond lines were established using plastic shim stock material.

Figure 10:
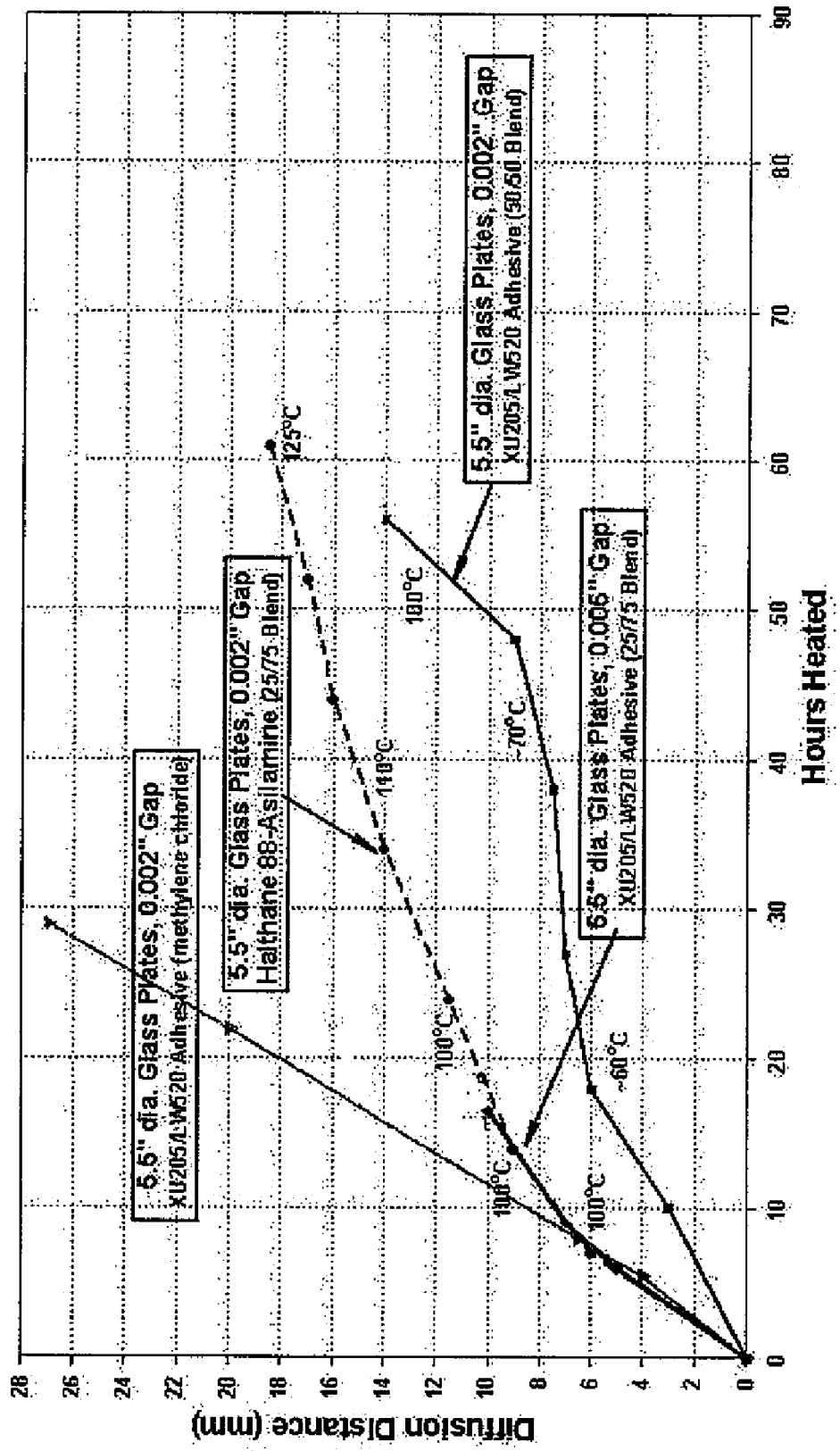
FIG. 10 presents plots of diffusion rates of solvents into adhesive bonds formed in test specimens that were fabricated as depicted in FIG. 9.

A third series of tests evaluated the effectiveness of various solvent blends in penetrating the narrow bond line between two flat glass plates 162 and 164, as depicted in FIG. 10. The glass plates were bonded together using ADIPRENE LW520-XU205 urethane adhesive or Halthane 88-Asilamine urethane adhesive.

The first example evaluated methylene chloride as the solvent. Two glass plates 162 and 164 (FIG. 9) were bonded together using ADIPRENE LW520-XU205 urethane adhesive to provide a 0.002" bond line 172, creating the first bond interface 168 and the second bond interface 170 having an interface diameter of approximately 58 mm. After 29 hours in methylene chloride at room temperature, the bond was soft enough to allow the glass plates 162 and 164 to be twisted apart. The solvent shrunk the original bond interface diameter to 54 mm.

A second test involved a narrow (0.002") bond line between two glass plates 162 and 164. For purposes of comparison, these plates were bonded as before using the ADIPRENE LW520-XU205 urethane adhesive. The plates 162 and 164 were immersed in a blend of 50 wt % benzaldehyde and 50 wt % M-pyrole. The solvent blend was heated to low temperatures initially to keep below the flash point of benzaldehyde (63° C.). For safety reasons, heating was done only for 9 hours per day. The solvent was allowed to cool overnight and was kept under argon. The glass plates remained in the solvent each night. The plates remained bonded after 38 hours of heating at 60° C., so heating was continued at 70° C. for 9 more hours. Since the plates remained bonded even at 70° C., the plates were heated at 100° C. for the next 9 hours. All heating was done under an argon cover gas. The plates finally did release after this last period of heating.

Figure 11:
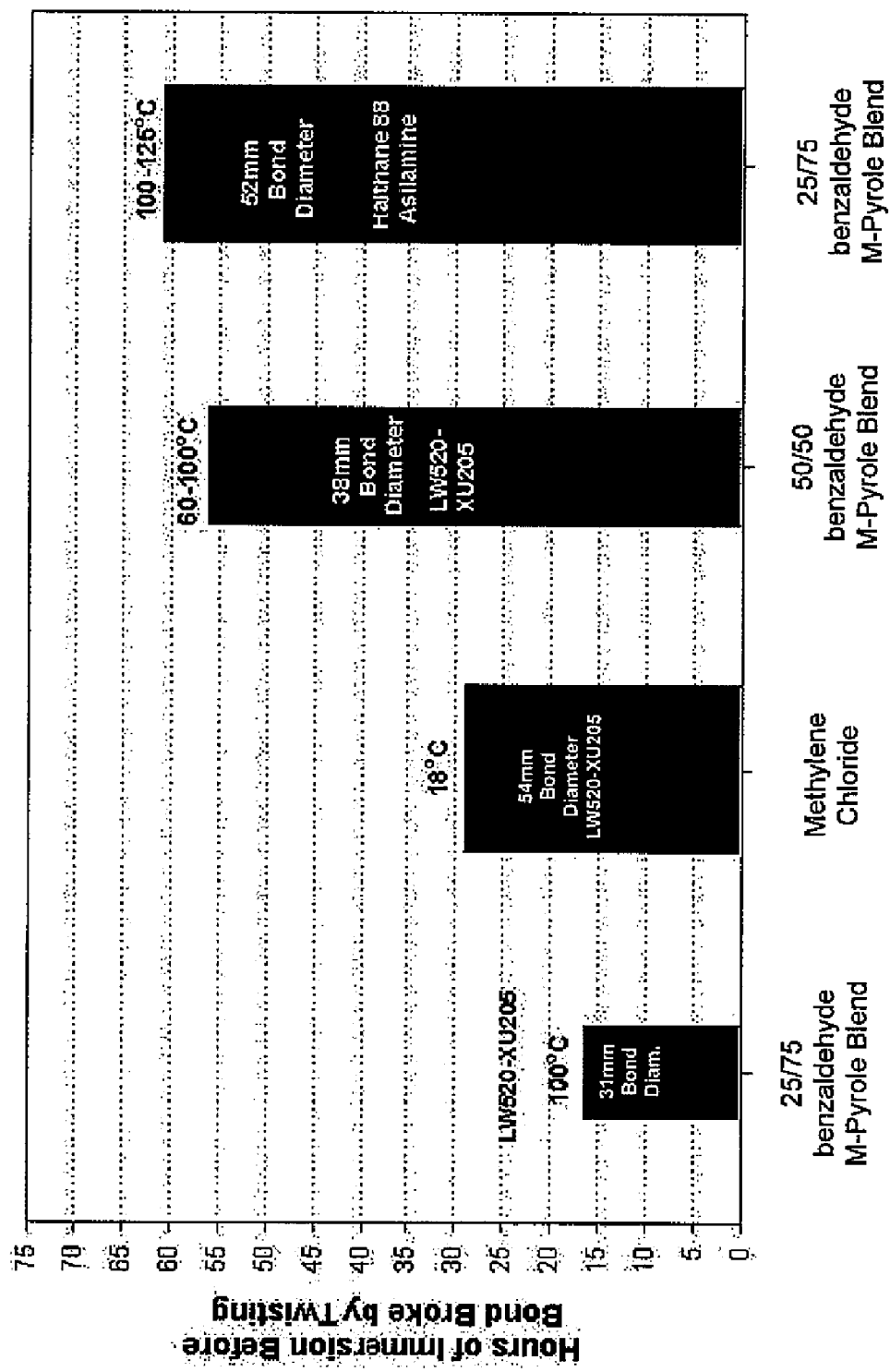
FIG. 11 presents bar charts of test results using different solvents to de-bond test specimens that were fabricated as illustrated in FIG. 9.

A third pair of glass plates (illustrated in FIG. 9 as 162 and 164) were also bonded with the ADIPRENE LW520-XU205 urethane adhesive, but with a wider 0.005" bond gap 172. This set of plates was immersed in a 25 wt % benzaldehyde/75 wt % M-pyrole blend at 100° C., under an argon cover gas. After just 16.5 hours of heating at 100° C. and 36 hours of heating and cooling, the plates twisted apart. The small 31 mm bond interface diameter in part accounts for the shorter time to separation of the plates. The higher solvent temperature and the optimum 25/75 blend accounts for the majority of this short separation time. Interestingly, the initial diffusion rates of the solvent into the adhesive matched that of methylene chloride at room temperature. The diffusion rate slowed down as the gel swelled and expanded radially. The comparative solvent diffusion rates are shown in FIG. 11.

As a fourth and final evaluation of the benzaldehyde/M-pyrole blend on thin bond lines, the two glass plates 162 and 164 were re-bonded using Halthane88-Asilamine urethane adhesive with a 0.002" bond gap. The Halthane88-Asilamine urethane adhesive is a more difficult urethane to dissolve than the ADIPRENE LW520-XU205 urethane adhesive. The bonded plates were placed in a 25 wt % benzaldehyde/75 wt % M-pyrole blend and heated at 100° C. for periods of 9 hours under an argon cover gas. Heating alternated with cooling periods overnight and weekends. The initial diffusion rates of the solvent (dashed line in FIG. 10) into the bond line matched that of methylene chloride. The Halthane 88-Asilamine urethane adhesive proved to be particularly stubborn, so after 34 hours at 100° C., the temperature was raised to 110° C., and finally to 125° C. Heating was done in a sealed reactor under flowing argon, so a potential fire was not a problem. The glass plates finally twisted apart after 61 hours of heating in the 25/75 blend. In addition to the recalcitrance of the Halthane 88-Asilamine urethane adhesive, another reason for this long time to separation was the fact that the initial bond interface diameter was 52 mm. The bond interface diameter increased as the solvent penetrated the adhesive and caused the adhesive to swell. This in turn increased the diffusion path for the solvent. Critical debonding parameters for all four sets of glass plates are compared in FIG. 11.

In summary, embodiments disclosed herein provide a non-RCRA-hazardous solvent blend that is effective in dissolving urethane adhesives and coatings. The disclosed solvent blend may be effective in dissolving urethane from thin bond lines and therefore in debonding objects that were bonded with urethane adhesives. Urethane that is open to the solvent is rapidly dissolved by the disclosed solvent blend. The solvent blend is particularly effective in cleaning up excess urethane foam, excessive adhesive, or coating overspray from a urethane application process. The solvent blend dissolves fully cured urethanes more slowly than freshly applied urethanes, but it is nonetheless effective in dissolving and/or debonding such urethanes. Some embodiments disclosed herein illustrate that a 25 wt % benzaldehyde/75 wt % M-pyrole blend dissolves fully cured urethanes faster than blends of M-pyrole and benzyl alcohol, tetrahydrofurfuryl alcohol, or γ-butyrolactone. Moreover, the γ-butyrolactone is becoming more difficult to obtain because of its diversion to the illegal drug trade. Blends of the other solvents, like methylene chloride, may simply soften and swell the urethane, making removal of urethane from thin bond lines much more difficult.

The foregoing descriptions of embodiments of this invention have been presented for purposes of illustration and exposition. They are not intended to be exhaustive or to limit the invention to the precise forms disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A miscible solvent comprising from about 20 to about 80 wt % carbaldehyde and from about 20 to about 80 wt % cyclic amide.

2. The solvent of claim 1 wherein the carbaldehyde comprises benzaldehyde or a structural analog thereof.

3. The solvent of claim 2 wherein the cyclic amide comprises N-methylpyrrolidone or a structural analog thereof.

4. The solvent of claim 3 wherein the solvent comprises from about 20 to about 30 wt % benzaldehyde or a structural analog thereof and from about 70 to about 80 wt % N-methylpyrrolidone or a structural analog thereof.

5. The solvent of claim 3 wherein the solvent comprises from about 30 to about 40 wt % benzaldehyde or a structural analog thereof and from about 60 to about 70 wt % N-methylpyrrolidone or a structural analog thereof.

6. The solvent of claim 3 wherein the solvent comprises from about 40 to about 60 wt % benzaldehyde or a structural analog thereof and from about 40 to about 60 wt % N-methylpyrrolidone or a structural analog thereof.

7. The solvent of claim 1 wherein cyclic amide comprises N-methylpyrrolidone or a structural analog thereof.

8. The solvent of claim 1 further comprising an extender.

9. A solvent consisting essentially of from about 20 to about 80 wt % carbaldehyde, from about 20 to about 80 wt % cyclic amide, and up to about 60 wt % non-aqueous extender.

10. The solvent of claim 9 wherein the carbaldehyde comprises benzaldehyde or a structural analog thereof.

11. The solvent of claim 10 wherein the cyclic amide comprises N-methylpyrrolidone or a structural analog thereof.

12. The solvent of claim 11 wherein the solvent comprises from about 20 to about 30 wt % benzaldehyde or a structural analog thereof and from about 70 to about 80 wt % N-methylpyrrolidone or a structural analog thereof.

13. The solvent of claim 11 wherein the solvent comprises from about 30 to about 40 wt % benzaldehyde or a structural analog thereof and from about 60 to about 70 wt % N-methylpyrrolidone or a structural analog thereof.

14. The solvent of claim 11 wherein the solvent comprises from about 40 to about 60 wt % benzaldehyde or a structural analog thereof and from about 40 to about 60 wt % N-methylpyrrolidone or a structural analog thereof.

15. The solvent of claim 9 wherein the cyclic amide comprises N-methylpyrrolidone or a structural analog thereof.

16. The solvent of claim 9 wherein the non-aqueous extender comprises one or more chemicals selected from the group consisting of isopropanol, ethanol, tetrahydro furfuryl alcohol, benzyl alcohol, and a caprolactone.

17. A method for separating a urethane bonded to a component at a bond interface, the urethane having an exposed surface, the method comprising the steps of:
(a) contacting the exposed surface with a solvent comprising a carbaldehyde and a cyclic amide for a period of time until the bond interface is weakened, the solvent being heated to a temperature above ambient temperature for at least a portion of the period of time; and
(b) separating the component from the urethane at the bond interface.

18. The method of claim 17 wherein step (a) comprises contacting the exposed surface with a solvent comprising a carbaldehyde and N-methylpyrrolidone or a structural analog thereof.

19. The method of claim 18 wherein step (a) comprises contacting the exposed surface with a solvent comprising benzaldehyde or a structural analog thereof and N-methylpyrrolidone or a structural analog thereof.

20. The method of claim 19 wherein step (a) comprises contacting the exposed surface with a solvent comprising from about 20 to about 30 wt % benzaldehyde or a structural analog thereof and from about 70 to about 80 wt % N-methylpyrrolidone or a structural analog thereof.

21. The method of claim 19 wherein step (a) comprises contacting the exposed surface with a solvent comprising from about 30 to about 40 wt % benzaldehyde or a structural analog thereof and from about 60 to about 70 wt % N-methylpyrrolidone or a structural analog thereof.

22. The method of claim 19 wherein step (a) comprises contacting the exposed surface with a solvent comprising from about 40 to about 60 wt % benzaldehyde or a structural analog thereof and from about 40 to about 60 wt % N-methylpyrrolidone or a structural analog thereof.

23. The method of claim 17 wherein step (a) comprises contacting the exposed surface with a solvent comprising benzaldehyde or a structural analog thereof and a cyclic amide.

* * * * *